Sept. 9, 1930.   F. H. ROWE   1,775,256
GUARD FOR AUTOMOBILE WINDSHIELDS
Filed Sept. 14, 1927

Inventor:
Fred H. Rowe.
by his atty.
Charles S. Gooding.

Patented Sept. 9, 1930

1,775,256

UNITED STATES PATENT OFFICE

FRED H. ROWE, OF GLOUCESTER, MASSACHUSETTS, ASSIGNOR OF ONE-HALF TO EDWIN WILCOCK, OF BOSTON, MASSACHUSETTS

GUARD FOR AUTOMOBILE WINDSHIELDS

Application filed September 14, 1927. Serial No. 219,384.

This invention relates to a guard for automobile windshields and has for its object to provide a device which may be mounted within an automobile between the front seat and windshield in such a position that a person sitting upon the seat at the rear of the guard will be prevented from being thrown against the windshield if the automobile hits an obstruction or an accident occurs tending to throw the person forwardly toward said windshield.

Another object of the invention is to provide a construction whereby the guard may be fastened to a door of the automobile in such a manner that when said door is opened that the guard will automatically be moved into a position where it will not interfere with the person entering or leaving the automobile through the doorway.

The invention consists in a guard for automobile windshields as set forth in the following specification and particularly as pointed out in the claims thereof.

Referring to the drawings.

Like numerals refer to like parts throughout the several views of the drawings.

Figure 1:
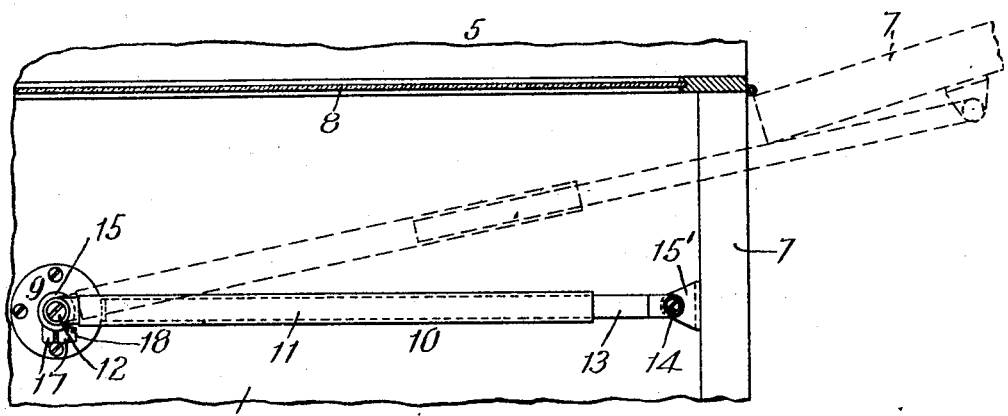
Figure 1 represents a plan view of a guard for automobile windshields embodying my invention.
Figure 2:
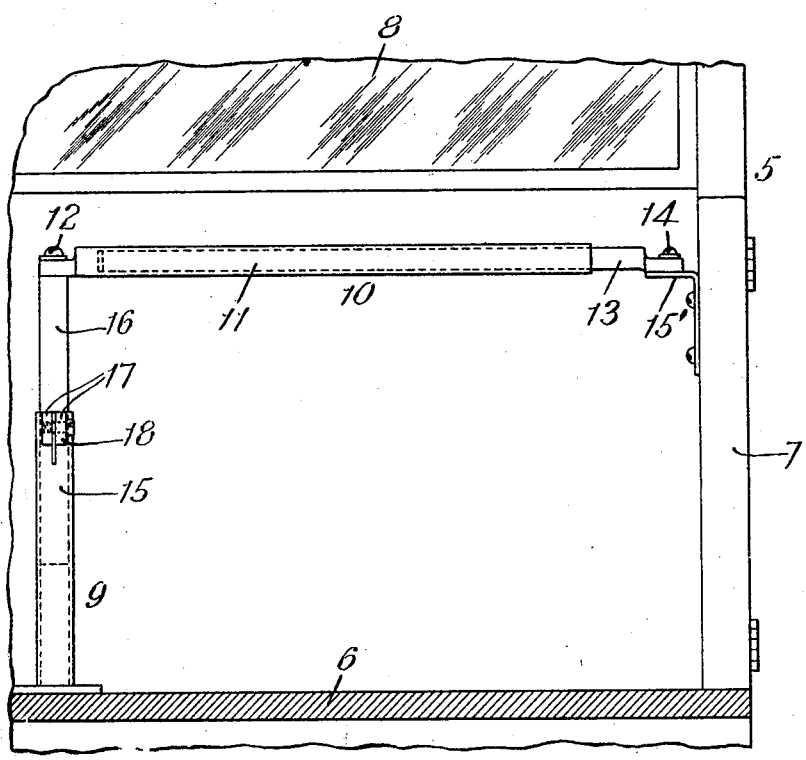
Fig. 2 is a rear elevation of the guard looking toward the front of the automobile.

In the drawings, 5 represents the body of an automobile, 6 a floor, 7 a right hand front door, and 8 a windshield. Fastened to the floor 6 and projecting upwardly therefrom at a suitable point between the two front doors of the automobile is a post 9, comprising a tubular standard 15 and a rod 16 slidable vertically therein. The tubular standard 15 is split at its upper end and is provided with a pair of oppositely disposed ears 17, a clamp screw 18 connecting the ears 17 and thus providing a means whereby the rod may be clamped firmly to the standard at any desired height, thus rendering it possible to adjust the rod 16 and vary the total height of the post 9 to suit varying dimensions and designs of automobiles to which the device is to be applied.

The space between the post 9 and door 7 is spanned by a telescopic member 10, the latter embodying therein a tubular section 11 which is pivotally attached at 12 to the top of the post 9 and a rod 13 which is slidable within the tubular section 11 and pivotally attached at 14 to a bracket 15' in turn fastened to the door 7.

When the door 7 is closed the telescopic member 10 is located parallel to the windshield 8, as illustrated in the full line position in Fig. 1, and when in this position the device will form an effective guard which will prevent a person sitting upon the front seat of the automobile from being thrown against the windshield, in the event that an accident occurs tending to throw said person forwardly. When the door 7 is opened the telescopic member 10 will swing into the position illustrated in dotted lines in Fig. 1, at which time it will be located in the position where it will not interfere with the person entering or leaving the automobile through the open doorway.

It will thus be seen that the telescopic member 10 constitutes a guard which is pivotally connected to the body of the automobile and the door to which the telescopic member is connected forms a means to lock the guard member or bar in guarding position between the windshield and the seat of the automobile, the said door or locking means being manually operable to release the telescopic member and allow it to be moved out of guarding position.

It will be seen that the device of this invention operates automatically, so that it will be positioned to guard the person sitting on the front seat when the door is closed and will be moved out of the way so that the person can enter or leave the automobile without any obstruction when the door is opened, the guard being moved to these different positions without any thought or action upon the part of the person who is to be guarded, other than to open or close the door.

I claim:

1. The combination with the windshield and door of a vehicle of an extensible member attached at one end thereof to the vehicle at a point at the rear of the windshield and at its other end to said door and constituting a guard for the windshield.

2. The combination with the windshield and door of a vehicle of a standard fast to the floor of the vehicle, and a telescopic member pivotally connected at one end thereof to said standard and at its other end to said door and constituting a guard for said windshield.

In testimony whereof I have hereunto set my hand.

FRED H. ROWE.